(12) United States Patent
Otsubo (10) Patent No.: US 11,821,586 B2
(45) Date of Patent: *Nov. 21, 2023

(54) MANUFACTURING METHOD OF HIGH-PRESSURE TANK

(71) Applicant: TOYOTA JIDOSHA KABUSHIKI KAISHA, Toyota (JP)

(72) Inventor: Hirokazu Otsubo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,671

(22) Filed: Aug. 3, 2021

(65) Prior Publication Data
US 2022/0112983 A1   Apr. 14, 2022

(30) Foreign Application Priority Data

Oct. 9, 2020   (JP) .................................. 2020-171470

(51) Int. Cl.
*F17C 1/06*   (2006.01)
(52) U.S. Cl.
CPC ........ *F17C 1/06* (2013.01); *F17C 2201/0109* (2013.01); *F17C 2203/0604* (2013.01);
(Continued)
(58) Field of Classification Search
CPC ................ F17C 1/06; F17C 2201/0109; F17C 2203/0604; F17C 2203/0619;
(Continued)

(56) References Cited

U.S. PATENT DOCUMENTS 3,150,219 A * 9/1964 Schmidt .................... F16L 9/12
264/258
3,388,932 A   6/1968 Bradley
(Continued)

FOREIGN PATENT DOCUMENTS

CA         3011556 A1 * 8/2017 ................ F17C 1/06
DE  102015204624 A1 * 9/2016
(Continued)

OTHER PUBLICATIONS

U.S. Appl. No. 17/231,093, filed Apr. 15, 2021.
(Continued)

*Primary Examiner* — John K Fristoe, Jr.
*Assistant Examiner* — Laura E. Parker
(74) *Attorney, Agent, or Firm* — Finnegan, Henderson, Farabow, Garrett & Dunner, LLP (57) ABSTRACT

This manufacturing method is a manufacturing method of a high-pressure tank that is formed by joining dome-shaped side end members to both ends of a cylindrical tube member and that has a first reinforcing layer made of fiber-reinforced resin. The manufacturing method has a joining step of joining the side end members to both ends of the tube member such that an outer wall surface of the tube member and an inner wall surface of each side end member face each other. In the joining step, a margin for overlap between each side end member and the tube member in an axial direction of the tube member is within a range of 5% or more to 35% or less relative to the inside diameter of the tube member.

2 Claims, 10 Drawing Sheets

(52) U.S. Cl.
CPC .................. *F17C 2203/067* (2013.01); *F17C 2203/0619* (2013.01); *F17C 2209/2154* (2013.01); *F17C 2209/234* (2013.01)

(58) Field of Classification Search
CPC ........ F17C 2203/067; F17C 2209/2154; F17C 2209/234; F17C 2209/00; F17C 2209/22; F17C 2209/23; F17C 2209/232
USPC ....................................................... 220/581
See application file for complete search history.

(56) References Cited

U.S. PATENT DOCUMENTS

| | | | |
|---|---|---|---|
| 5,547,533 | A | 8/1996 | Berglund |
| 11,298,868 | B2 * | 4/2022 | Katano ................. B29C 53/587 |
| 2012/0234840 | A1 * | 9/2012 | Strassburger ......... B29C 70/462 |
| | | | 156/196 |
| 2020/0158286 | A1 * | 5/2020 | Criel ........................ F17C 1/16 |
| 2021/0213689 | A1 | 7/2021 | Maeda et al. |
| 2021/0237367 | A1 | 8/2021 | Takami |
| 2022/0009150 | A1 * | 1/2022 | Katano ..................... F17C 1/06 |
| 2022/0032531 | A1 | 2/2022 | Katano |

FOREIGN PATENT DOCUMENTS

| | | | |
|---|---|---|---|
| DE | 10 2016 222 674 | A1 | 5/2018 |
| DE | 10 2020 126 412 | A1 | 7/2021 |
| DE | 10 2020 135 050 | A1 | 8/2021 |
| EP | 2 000 288 | A1 | 12/2008 |
| EP | 3667152 | A1 * | 6/2020 ............. B29C 45/16 |
| JP | 48-080908 | U | 12/1971 |
| JP | 06-510354 | A | 11/1994 |
| JP | 2012-149739 | A | 8/2012 |
| JP | 2012-202479 | A | 10/2012 |
| JP | 2017-048912 | A | 3/2017 |
| JP | 2017-110669 | A | 6/2017 |
| JP | 2017-180521 | A | 10/2017 |
| JP | 2018-091773 | A | 6/2018 |
| JP | 2018-527534 | A | 9/2018 |
| JP | 2019-044937 | A | 3/2019 |
| JP | 2019-507851 | A | 3/2019 |
| JP | 2019-151072 | A | 9/2019 |
| JP | 2020-525735 | A | 8/2020 |
| WO | WO 91/18239 | | 11/1991 |
| WO | WO 92/20954 | A1 | 11/1992 |
| WO | WO-2013142729 | A1 * | 9/2013 ........... B60K 15/067 |
| WO | WO 2017/015536 | A1 | 1/2017 |
| WO | WO 2019/007978 | A1 | 1/2019 |

OTHER PUBLICATIONS

Office Action issued in U.S. Appl. No. 17/231,093 dated Oct. 18, 2021.

Notice of Allowance issued in U.S. Appl. No. 17/231,093 dated Dec. 27, 2021.

Office Action issued in U.S. Appl. No. 17/341,939 dated Oct. 25, 2022.

Notice of Allowance issued in U.S. Appl. No. 17/341,939 dated Mar. 8, 2023.

* cited by examiner

MANUFACTURING METHOD OF HIGH-PRESSURE TANK

CROSS-REFERENCE TO RELATED APPLICATION

This application claims priority to Japanese Patent Application No. 2020-171470 filed on Oct. 9, 2020, incorporated herein by reference in its entirety.

BACKGROUND

1. Technical Field

The present disclosure relates to a manufacturing method of a high-pressure tank.

2. Description of Related Art

High-pressure tanks storing fuel gas are used, for example, in natural gas vehicles and fuel cell electric vehicles. A high-pressure tank of this type includes a liner that hermetically holds fuel gas and a reinforcing layer that covers an outer surface of the liner.

As one example of such high-pressure tanks, Japanese Unexamined Patent Application Publication No. 2019-044937 (JP 2019-044937 A) discloses a high-pressure tank that has a liner including a tubular body part and domed side end parts formed on both sides of the body part. This high-pressure tank further includes a reinforcing layer made of fiber-reinforced resin that covers an outer surface of the liner.

SUMMARY

If the reinforcing layer of the high-pressure tank described in JP 2019-044937 A employs a structure in which dome-shaped side end members are joined at both ends of a cylindrical tube member, since the tube member and the side end members that are independent members are joined together, the strength of the high-pressure tank varies depending on the assembly conditions of these members. An analysis conducted by the present inventor found that when each side end member and a tube member are joined together in a state of overlapping with each other in an axial direction of the tube member, stress that is exerted by an internal pressure of the high-pressure tank on joint portions between these members varies significantly depending on the overlapping conditions, which causes unevenness in the reinforcing layer that is composed of a plurality of layers.

The present disclosure has been contrived in view of this finding, and an object thereof is to provide a manufacturing method of a high-pressure tank that can stably secure the mechanical strength of the high-pressure tank even when it has a structure in which side end members are joined on both sides of a tube member.

A manufacturing method of a high-pressure tank according to the present disclosure in view of this object is a manufacturing method of a high-pressure tank that is formed by joining dome-shaped side end members to both ends of a cylindrical tube member and that has a reinforcing layer made of fiber-reinforced resin. This manufacturing method has a step of joining the side end members to both ends of the tube member such that an outer wall surface of the tube member and an inner wall surface of each of the side end members face each other. In the joining step, a margin for overlap between each of the side end members and the tube member in an axial direction of the tube member is within a range of 5% or more to 35% or less relative to the inside diameter of the tube member.

According to the present disclosure, in the joining step, the side end members are joined to both ends of the tube member such that the outer wall surface of the tube member and the inner wall surface of each side end member face each other. Thus, deformation of the tube member trying to expand in a radial direction upon generation of an internal pressure can be borne by the side end members. When the side end members and the tube member are overlapped with each other, the strength of overlapping portions tends to vary depending on interference, clearance, etc. In the present disclosure, therefore, the margin for overlap between each side end member and the tube member is specified to be within a range (a range of ratio) of 5% or more to 35% or less relative to the inside diameter of the tube member. Thus, stress acting on reinforced portions of the tube member and the side end members that are the overlapping portions can be stably reduced, and moreover, variation in stress distribution in the reinforcing layer that is composed of a plurality of layers can also be reduced. Here, if the above ratio is lower than 5%, a structure that can sufficiently withstand shear stress and bending stress on the overlapping portions (particularly border portions between the dome-shaped parts and the circular part) cannot be obtained. On the other hand, if the above ratio exceeds 35%, it becomes difficult to fit the side end members into the tube member due to geometrical intersection between the side end members and the tube member.

As a preferred aspect, when the reinforcing layer formed after the joining step is a first reinforcing layer, a second reinforcing layer that covers the first reinforcing layer is additionally formed by winding a fiber bundle impregnated with resin around the first reinforcing layer by helical winding so as to fill the gap between the side end members on both sides of the first reinforcing layer. According to this aspect, a load acting on the high-pressure tank in the axial direction can be borne by the second reinforcing layer.

The present disclosure can stably secure the mechanical strength of a high-pressure tank even when it has a structure in which side end members are joined on both sides of a tube member.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a high-pressure tank 1 according to the present disclosure will be described below with reference to the drawings.

In the following, the high-pressure tank 1 will be described as a tank that is filled with high-pressure hydrogen gas and installed in a fuel cell electric vehicle, but the high-pressure tank 1 can be used also for other purposes. Without being limited to high-pressure hydrogen gas, examples of gases that can fill the high-pressure tank 1 include compressed gases such as compressed natural gas (CNG) and various liquefied gases such as liquefied natural gas (LNG) and liquefied petroleum gas (LPG).

1. High-Pressure Tank 1

Figure 1:
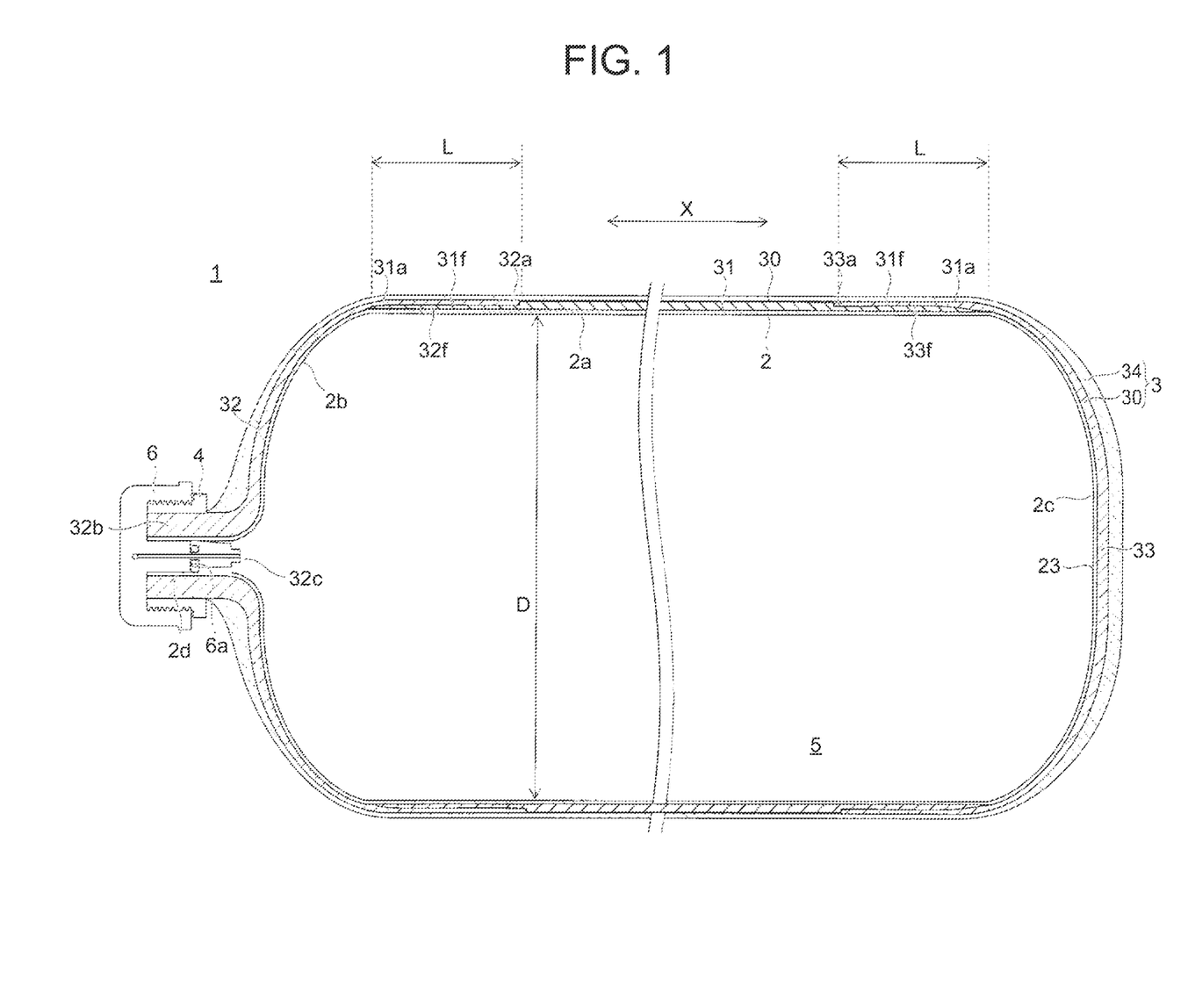
FIG. 1 is a schematic sectional view showing the structure of a high-pressure tank according to one embodiment of the present disclosure.
Figure 2:
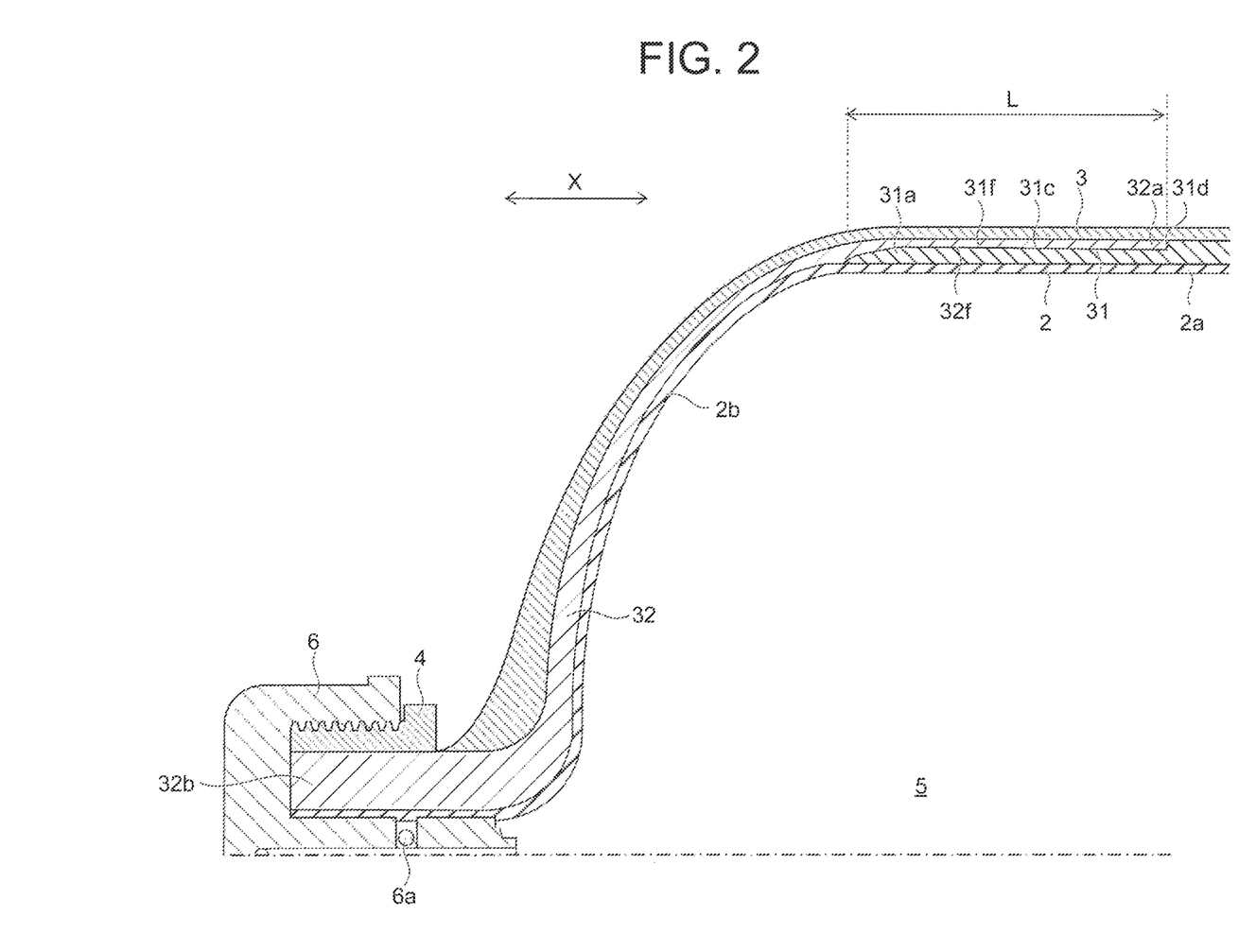
FIG. 2 is a partial sectional view showing the structure of the high-pressure tank shown in FIG. 1.

As shown in FIG. 1 and FIG. 2, the high-pressure tank 1 is a high-pressure gas storage container having a substantially cylindrical shape with both ends rounded into a dome shape. The high-pressure tank 1 includes a liner 2 having gas barrier properties, and a reinforcing layer 3 that is made of fiber-reinforced resin and covers an outer surface of the liner 2. The reinforcing layer 3 has a first reinforcing layer 30 that covers the outer surface of the liner 2 and a second reinforcing layer 34 that covers an outer surface of the first reinforcing layer 30. An opening is formed at one end of the high-pressure tank 1, and a cap 4 is mounted around the opening.

The liner 2 is a resin member forming a housing space 5 to be filled with high-pressure hydrogen gas. The liner 2 has a body part 2a and side end parts 2b, 2c formed on both sides of the body part 2a. The body part 2a extends to a predetermined length along an axial direction X of the high-pressure tank 1 and has a cylindrical shape. The side end parts 2b, 2c are continuously formed on both sides of the body part 2a and have a dome shape. The diameter of each of the side end parts 2b, 2c decreases in a direction away from the body part 2a. One side end part 2b has a pipe-like portion 2d formed at a portion at which the diameter is smallest, and this pipe-like portion 2d has a through-hole.

The cap 4 is formed by processing a metal material, such as aluminum or aluminum alloy, into a predetermined shape. A valve 6 for filling the housing space 5 with hydrogen gas and discharging the hydrogen gas from the housing space 5 is mounted on the cap 4. The valve 6 is provided with a seal member 6a that seals the housing space 5 of the high-pressure tank 1 by coming into contact with an inner surface of the liner 2 at a protrusion 32b of a side end member 32 to be described later.

The reinforcing layer 3 functions to enhance the mechanical strength, such as the rigidity and the pressure resistance, of the high-pressure tank 1 by reinforcing the liner 2, and is made of fiber-reinforced resin that is obtained by impregnating reinforcing fibers (continuous fibers) with resin. In this embodiment, as described above, the reinforcing layer 3 has the first reinforcing layer 30 that covers the outer surface of the liner 2 and the second reinforcing layer 34 that covers the outer surface of the first reinforcing layer 30. The first reinforcing layer 30 has a cylindrical tube member 31 that covers the body part 2a of the liner 2, and dome-shaped side end members (dome members) 32, 33 that are joined on both sides of the tube member 31 so as to cover the side end parts 2b, 2c, and is integrally formed by these members. The first reinforcing layer 30 in this embodiment corresponds to the "reinforcing layer" as termed in the present disclosure.

The first reinforcing layer 30 is a member formed by laminating a plurality of fiber-reinforced resin layers made of resin-impregnated reinforcing fibers. The reinforcing fibers of the tube member 31 are oriented circularly at an angle substantially orthogonal to an axial direction X of the tube member 31. In other words, the reinforcing fibers of the tube member 31 are oriented in a circumferential direction of the tube member 31. The reinforcing fibers of the side end members 32, 33 are not oriented in the circumferential direction of the tube member 31 but extend in various directions intersecting with the circumferential direction, from near their respective apexes toward circumferential ends 32a, 33a.

In this embodiment, the reinforcing fibers of the tube member 31 and the reinforcing fibers of the side end members 32, 33 are not continuous (not connected). This is because, as will be described later, the tube member 31 and the side end members 32, 33 are separately formed and then the side end members 32, 33 are mounted at both ends of the tube member 31.

As the reinforcing fibers composing the first reinforcing layer 30 (i.e., the tube member 31 and the side end members 32, 33), glass fibers, aramid fibers, boron fibers, carbon fibers, etc. can be used, and particularly using carbon fibers is preferred from the viewpoint of light weight, mechanical strength, etc.

While the resin (matrix resin) impregnating the reinforcing fibers of the first reinforcing layer 30 is not particularly limited, a thermoplastic resin or a thermosetting resin can be used. Examples of thermoplastic resins include polyetheretherketone, polyphenylene sulfide, polyacrylic acid ester, polyimide, polyamide, nylon 6, and nylon 6,6. Examples of thermosetting resins include phenolic resin, melamine resin, urea resin, and epoxy resin. In particular, using epoxy resin is preferred from the viewpoint of mechanical strength etc. Epoxy resin has fluidity in an uncured state and forms a strong cross-linked structure after being heat-cured.

The second reinforcing layer 34 is a layer formed by laminating a plurality of fiber-reinforced resin layers made of resin-impregnated reinforcing fibers. The second reinforcing layer 34 is formed so as to cover an outer wall surface of the first reinforcing layer 30. That is, in this embodiment, the second reinforcing layer 34 is a layer that covers an outer wall surface of the tube member 31 and outer surfaces of the side end members 32, 33.

Specifically, the second reinforcing layer 34 is a layer made of fiber-reinforced resin of which the fibers are oriented across the two side end members 32, 33. The reinforcing fibers of the second reinforcing layer 34 are oriented so as to be inclined relatively to the axial direction X of the tube member 31 by helical winding (so-called low helical winding) of a fiber bundle impregnated with resin. These reinforcing fibers can restrain the side end members 32, 33 on the tube member 31. Thus, the side end members 32, 33 can be prevented from coming off from the tube member 31 toward an outer side along the axial direction X due to gas pressure during use of the high-pressure tank 1.

The same materials as those mentioned as examples for the first reinforcing layer 30 can be named as examples of the reinforcing fibers composing the second reinforcing layer 34, and the same materials as those mentioned as examples for the first reinforcing layer 30 can be named as examples of the resin that impregnates the reinforcing fibers.

In this embodiment, the side end members 32, 33 are joined at both ends of the tube member 31 such that an outer wall surface 31f of the tube member 31 constituting a part of the first reinforcing layer 30 and inner wall surfaces 32f, 33f of the side end members 32, 33 face each other. Specifically, the outer wall surface 31f of the tube member 31 has, at both ends thereof, depressions 31c into which portions of the side end members 32, 33 including circumferential ends 32a, 33a fit, and stepped portions 31d that come into contact with the circumferential ends 32a, 33a of the side end members 32, 33. A margin for overlap L between each of the side end members 32, 33 and the tube member 31 in the axial direction X of the tube member is within a range of 5% or more to 35% or less relative to an inside diameter D of the tube member 31. The basis for this range etc. will be described later. For the convenience of description, the margin for overlap L is depicted shorter in FIG. 1 than in FIG. 2.

2. Manufacturing Method of High-Pressure Tank 1

Figure 3:
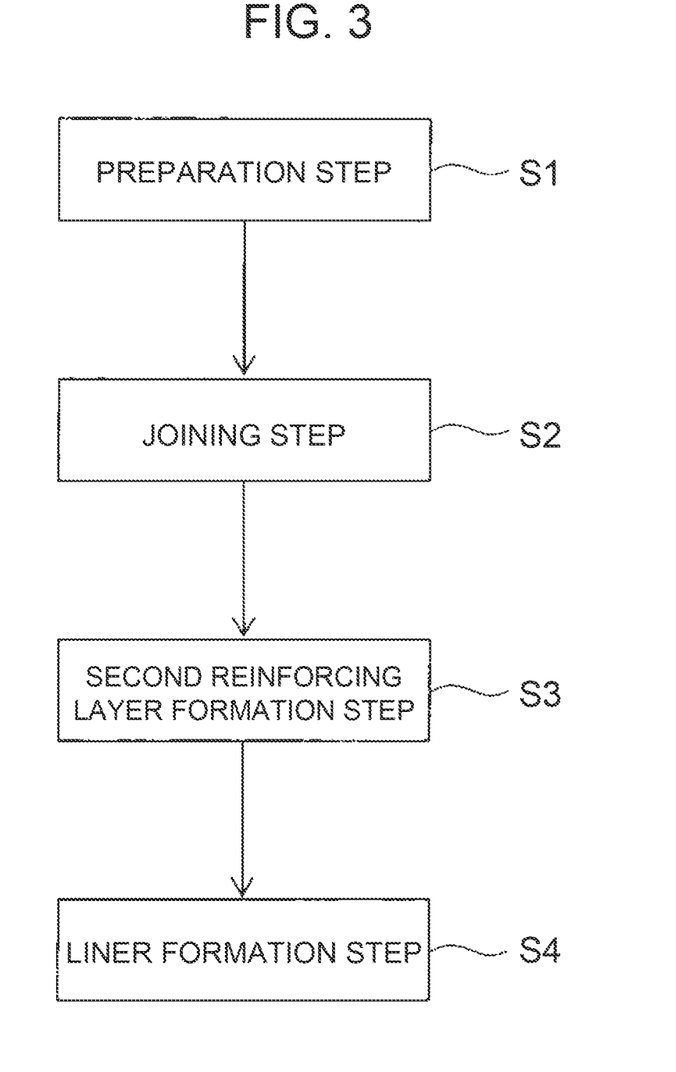
FIG. 3 is a flowchart illustrating steps of a manufacturing method of the high-pressure tank according to one embodiment of the present disclosure.

Next, a manufacturing method of the high-pressure tank 1 according to the embodiment will be described. FIG. 3 is a flowchart illustrating steps of the manufacturing method of the high-pressure tank 1. As shown in FIG. 3, the manufacturing method of the high-pressure tank 1 includes a preparation step S1, a joining step S2, a second reinforcing layer formation step S3, and a liner formation step S4.

2-1. Preparation Step S1

Formation of Tube Member and Side End Members

The tube member 31 and the side end members 32, 33 are formed independently of each other, and therefore these members may be concurrently formed or either member may be formed first. First, a method of forming the tube member 31 will be described below.

Figure 4:
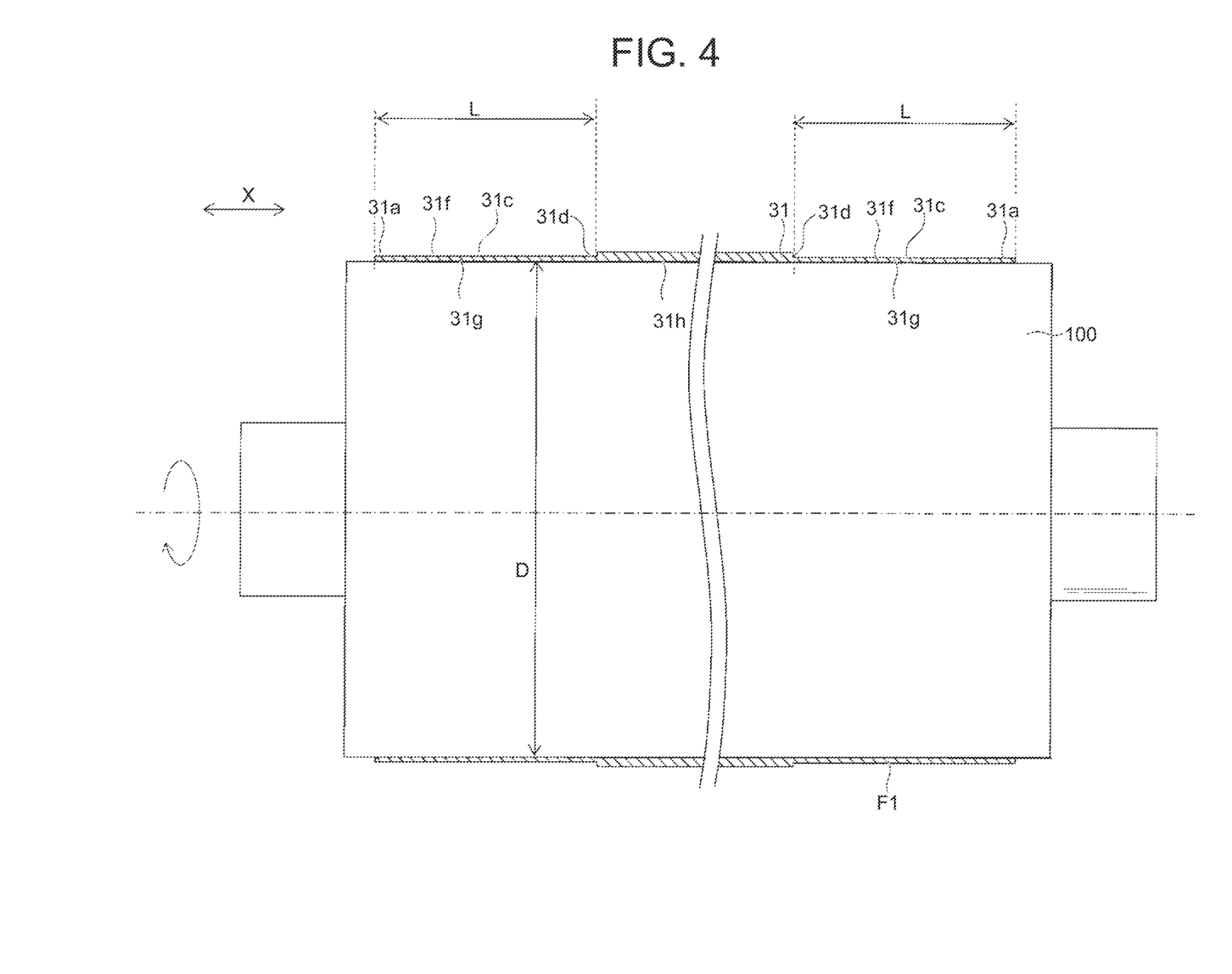
FIG. 4 is a schematic sectional view illustrating a method of forming a tube member in a preparation step shown in FIG. 3.

In the method of forming the tube member 31, as shown in FIG. 4, for example, a fiber bundle F1 impregnated with resin is wound around an outer surface of a columnar mandrel 100 by a filament winding method using hoop winding or high-angle helical winding to form the tube member 31. Here, hoop winding refers to winding the fiber bundle F1 at an inclination relative to the axial direction X such that edges of the fiber bundle F1 in a longitudinal direction thereof overlap one another without clearance. It is preferable that the fiber bundle F1 be inclined at 89° or more relatively to the axial direction X. High-angle helical winding refers to winding the fiber bundle F1 at an inclination within a range of 80° or more and less than 88° relatively to the axial direction X, and doing so while moving the fiber bundle F1 back and forth over a section between both ends of the mandrel 100. The outside diameter of the mandrel 100 corresponds to the diameter of an inner circumference of the circumferential ends 32a, 33a of the side end members 32, 33 at an outermost position.

During this process, the depressions 31c into which the portions of the side end members 32, 33 including the circumferential ends 32a, 33a fit and the stepped portions 31d may be formed at both ends of the outer wall surface 31f of the tube member 31 by, for example, changing the number of times the fiber bundle F1 is wound in a radial direction of the tube member 31. Each depression 31c is formed from a farthest end of the tube member 31 toward an inner side (a center side of the tube member 31) over the length L in the axial direction X, and a part where the depression 31c is formed constitutes a thin-walled part 31g. The thickness of the thin-walled part 31g is smaller than the thickness of the other part (specifically, a tube member main body 31h), and the stepped portion 31d is formed between the thin-walled part 31g and the tube member main body 31h.

This shape may be produced by forming a tube member with a constant thickness and then cutting this tube member. In this embodiment, however, the tube member 31 of this shape is formed through winding of the fiber bundle F during formation of the tube member 31, so that the fibers are not cut. Thus, the mechanical strength of the tube member 31 can be secured.

As an alternative method of forming the tube member 31, a fiber sheet being unreeled may be wound around the mandrel 100 multiple times while the mandrel 100 is rotated in a circumferential direction by a rotating mechanism (not shown). This fiber sheet is a sheet composed of reinforcing fibers that are arranged in parallel in one direction and impregnated with resin, and is wound around the mandrel 100 such that the reinforcing fibers are oriented in the circumferential direction of the mandrel 100. Thus, the tube member 31 with the reinforcing fibers oriented in the circumferential direction is formed.

Figure 5:
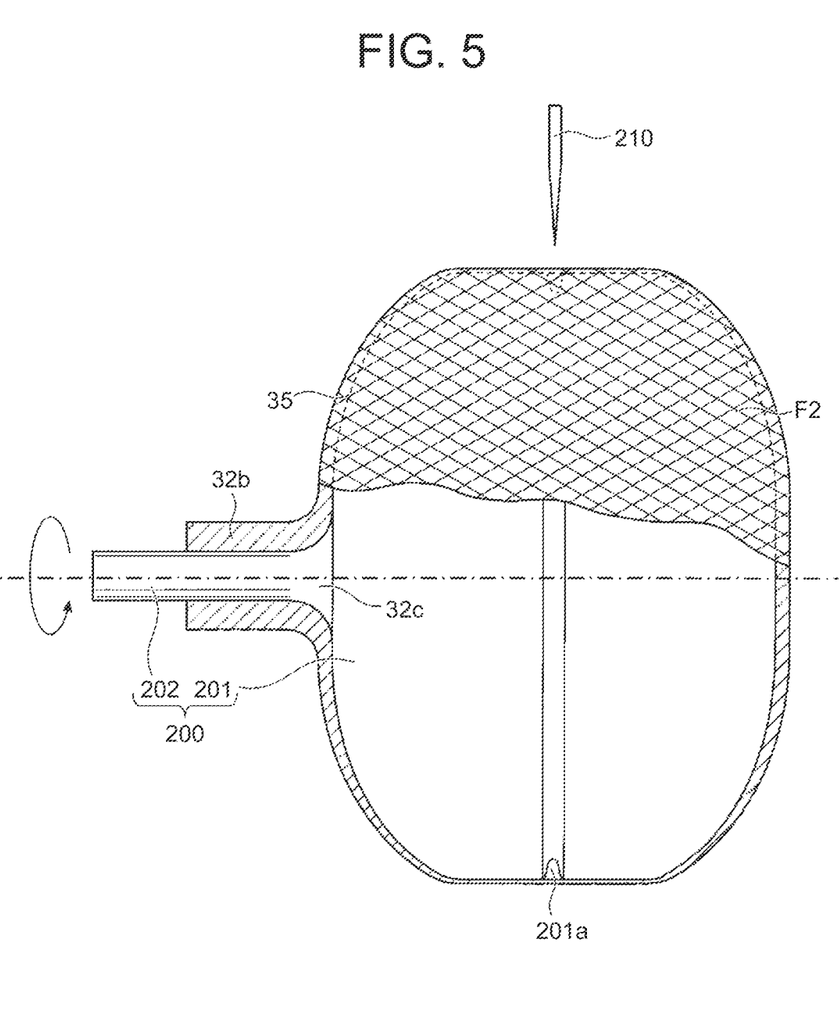
FIG. 5 is a partial sectional view illustrating a method of forming side end members in the preparation step shown in FIG. 3.

Next, in a method of forming the side end members 32, 33, as shown in FIG. 5, a fiber bundle F2 impregnated with resin is wound around an outer surface of a mandrel 200 by, for example, a filament winding (FW) method. Specifically, the mandrel 200 has a main body 201 and a shaft 202 extending outward from one end of the main body 201.

The main body 201 has a circular shape as seen from an axial direction of the shaft 202. An outer circumferential surface of the main body 201 has, at the center in an anaxial direction thereof, a groove 201a that extends so as to circle the main body 201 in a circumferential direction. The outer surface of the mandrel 200 has a shape of outer wall surfaces of the dome-shaped side end parts 2b, 2c, except for the body part 2a, of the liner 2 joined together, and the groove 201a is formed at a position corresponding to the joint. The shaft 202 is rotatably supported by a rotating mechanism (not shown).

To form the side end members 32, 33, first, a winding 35 is formed by rotating the mandrel 200 and winding the fiber bundle F2 so as to cover the outer surface of the mandrel 200. During this process, the fiber bundle F2 is wound also around an outer surface of the shaft 202, and thus the cylindrical protrusion 32b having the through-hole 32c is formed as shown in FIG. 5. The fiber bundle F2 is wound so as to intersect with the axial direction of the shaft 202 at an angle of, for example, 30° to 50°. While the material of the mandrel 200 is not particularly limited, it is preferable that the mandrel 200 be made of metal to secure the strength not to deform while the fiber bundle F2 is wound.

The same materials as those mentioned as examples for the first reinforcing layer 30 can be named as examples of the reinforcing fibers of the fiber bundle F2, and the same materials as those mentioned as examples for the first reinforcing layer 30 can be named as examples of the resin that impregnates the reinforcing fibers. When the resin of the fiber bundle F2 is thermoplastic resin, the fiber bundle F2 is wound around the mandrel 200 in a state where the thermoplastic resin has been heated to soften. On the other hand, when the resin of the fiber bundle F2 is thermosetting resin, the fiber bundle F2 is wound around the mandrel 200 in a state where the thermosetting resin is not yet cured.

Next, the winding 35 having been wound around the outer surface of the mandrel 200 is divided into two parts using a cutter 210 (see FIG. 5). Then, the divided winding 35 is separated from the mandrel 200 to form the pair of side end members 32, 33.

Specifically, in the state shown in FIG. 5, the cap 4 is mounted onto an outer surface of the protrusion 32b. When the resin impregnating the fiber bundle F2 of the winding 35 is thermosetting resin, the winding 35 is heated to cure under conditions (a heating temperature and a heating time) of preliminary curing or main curing. On the other hand, when the resin impregnating the fiber bundle F2 of the winding 35 is thermoplastic resin, the softened thermoplastic resin is cooled to solidify the resin of the fiber bundle F2.

In a state where the resin impregnating the fiber bundle F2 has been thus heat-cured or solidified, a cutting edge of the cutter 210 is inserted into the groove 201a of the mandrel 200 while the mandrel 200 is rotated. Thus, the fiber bundle F2 is cut by the cutter 210 and the winding can be divided into two. The divided winding is separated from the mandrel 200 to form the two side end members 32, 33. While the cutter 210 is not particularly limited, for example, a rotating disc that has a blade formed on an outer circumferential surface, a thin plate that has a blade formed on a side surface, or a cutter that cuts the fiber bundle F2 by laser light can be used as the cutter 210.

Since the fiber bundle F2 is cut by the cutter 210 in the state where the resin impregnating the fiber bundle F2 has been heat-cured or solidified, deformation of the fiber bundle F2 during cutting can be mitigated, and moreover, deformation of the two side end members 32, 33 during removal from the mandrel 200 can also be mitigated.

While the example in which the fiber bundle F2 is cut by the cutter 210 in the state where the resin of the fiber bundle F2 has been heat-cured or solidified has been shown here, it is also possible to cut the fiber bundle F2 by the cutter 210 without heat-curing or solidifying the resin of the fiber bundle F2. In this case, the resin may be heat-cured or solidified after the fiber bundle F2 is cut by the cutter 210.

While the example in which the fiber bundle F2 impregnated with resin is wound around the outer surface of the mandrel 200 has been shown here, it is also possible to form a winding by winding a fiber bundle F2 that is not impregnated with resin around the outer surface of the mandrel 200 and then impregnating this winding with resin.

Further, the example in which the cap 4 is mounted onto the outer surface of the protrusion 32b after the fiber bundle F2 is wound around the outer surface of the mandrel 200 has been shown here. However, it is also possible to mount the cap onto a connecting portion between the main body 201 and the shaft 202 of the mandrel 200 in advance and, in this state, wind the fiber bundle F2 around part of the cap along with the outer surface of the mandrel 200. In this case, part of the cap is covered and restrained by the fiber bundle F2, and thus the cap can be firmly fixed by the fiber bundle F2.

2-2. Joining Step S2

Figure 6:
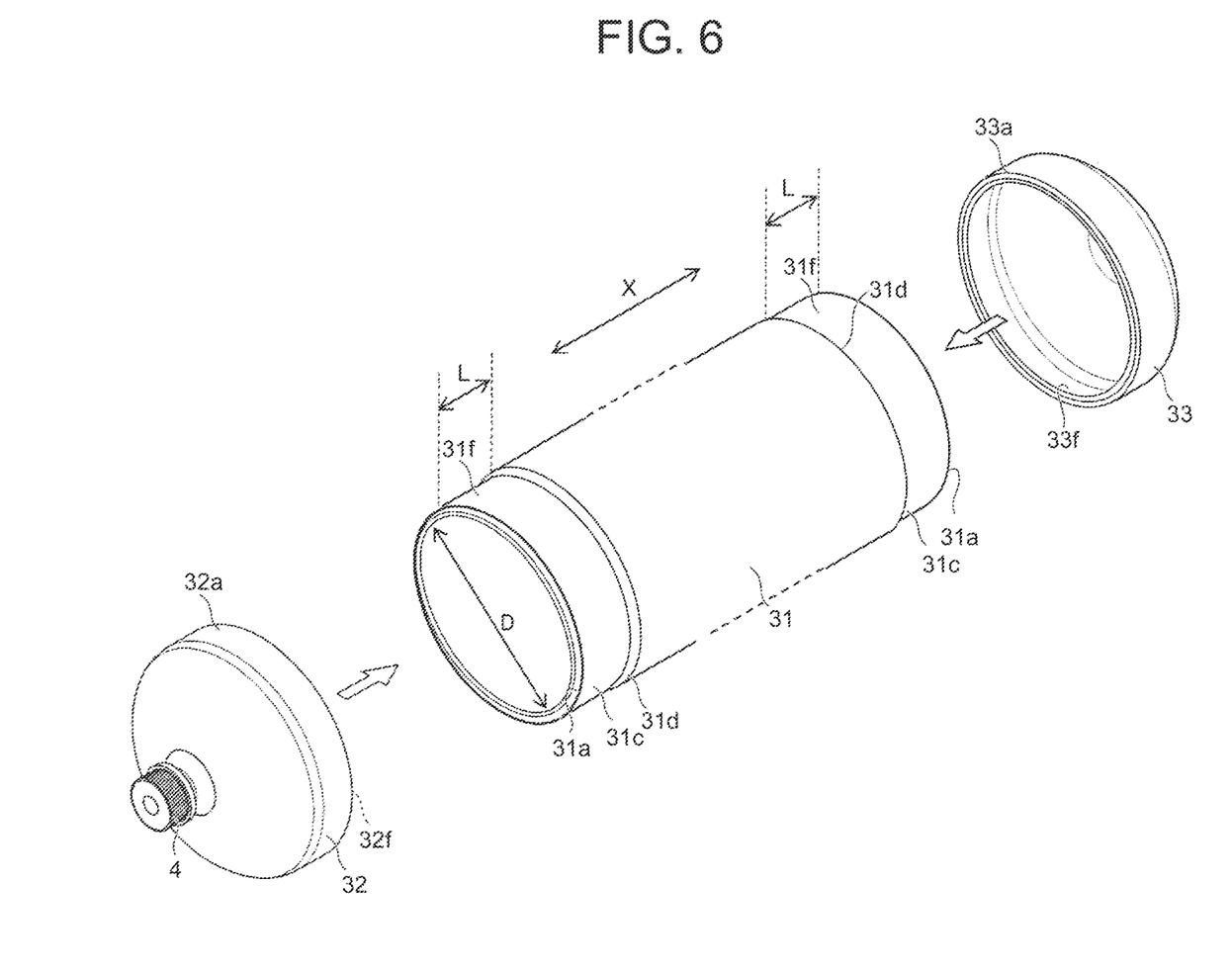
FIG. 6 is a schematic perspective view illustrating a joining step shown in FIG. 3.
Figure 7:
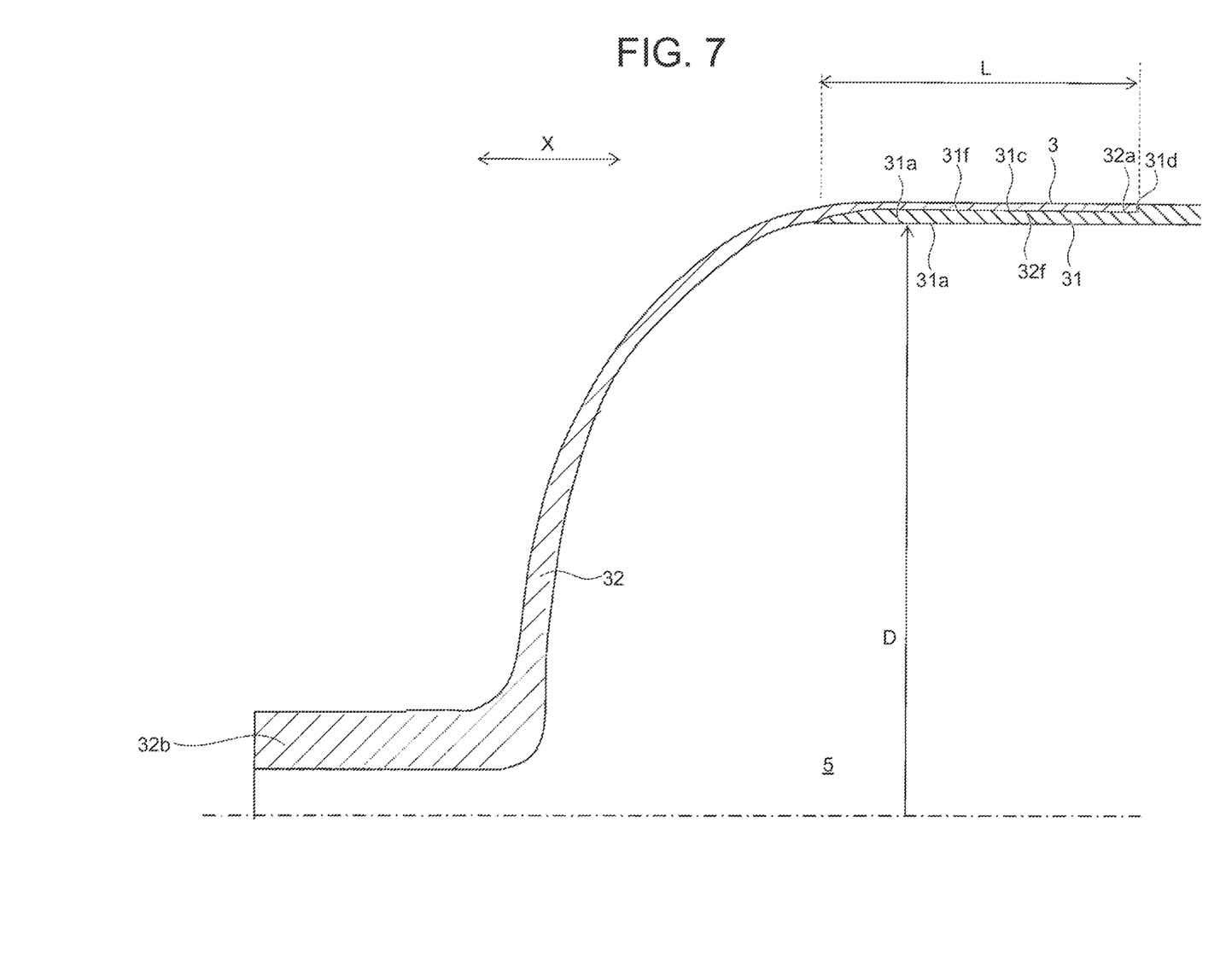
FIG. 7 is a partial sectional view of the side end member and the tube member after the joining step shown in FIG. 3.

In the joining step S2, as shown in FIG. 6 and FIG. 7, the side end members 32, 33 are joined to both ends of the tube member 31 such that the outer wall surface 31f of the tube member 31 and the inner wall surfaces 32f, 33f of the side end members 32, 33 face each other. Specifically, the portions of the side end members 32, 33 including the circumferential ends 32a, 33a are fit into the depressions 31c formed at both ends of the outer wall surface 31f of the tube member 31 until end surfaces of the circumferential ends 32a, 33a of the side end members 32, 33 come into contact with the stepped portions 31d, 31d.

Thus, in the joining step, the margin for overlap L between each of the side end members 32, 33 and the tube member 31 in the axial direction X of the tube member 31 can be set to be within a range of 5% or more to 35% or less (a range of 5% to 35%) relative to the inside diameter D of the tube member 31.

The tube member 31 and the side end members 32, 33 may be joined together, for example, through an adhesive. It is preferable that the adhesive be an adhesive of the same type as the resin that is used as the fiber-reinforced resin composing the tube member 31 and the side end members 32, 33. Alternatively, in the case where the resin of the fiber-reinforced resin composing the tube member 31 and the side end members 32, 33 is thermosetting resin, as described above, these members may be butted together in a state where the thermosetting resin has been subjected to preliminary curing, and then the thermosetting resin may be subjected to main curing by heating to join these members together.

Here, in a case where the tube member 31 and the side end members 32, 33 are not restrained by an adhesive or the like in the axial direction X, it is preferable that there be a frictional force in the axial direction X acting between the tube member 31 and the side end member 32 (33), and that the coefficient of friction be 0.22 or higher. Such a frictional force can be set through selection of the materials of these members, adjustment of the surface roughness of these members, etc.

A clearance at the overlapping portions between the tube member 31 and the side end members 32, 33 may be formed within a range of 03 mm or more to 0.6 mm or less. This makes it easy to attach the side end members 32, 33 to the tube member 31.

2-3. Second Reinforcing Layer Formation Step S3

Figure 8:
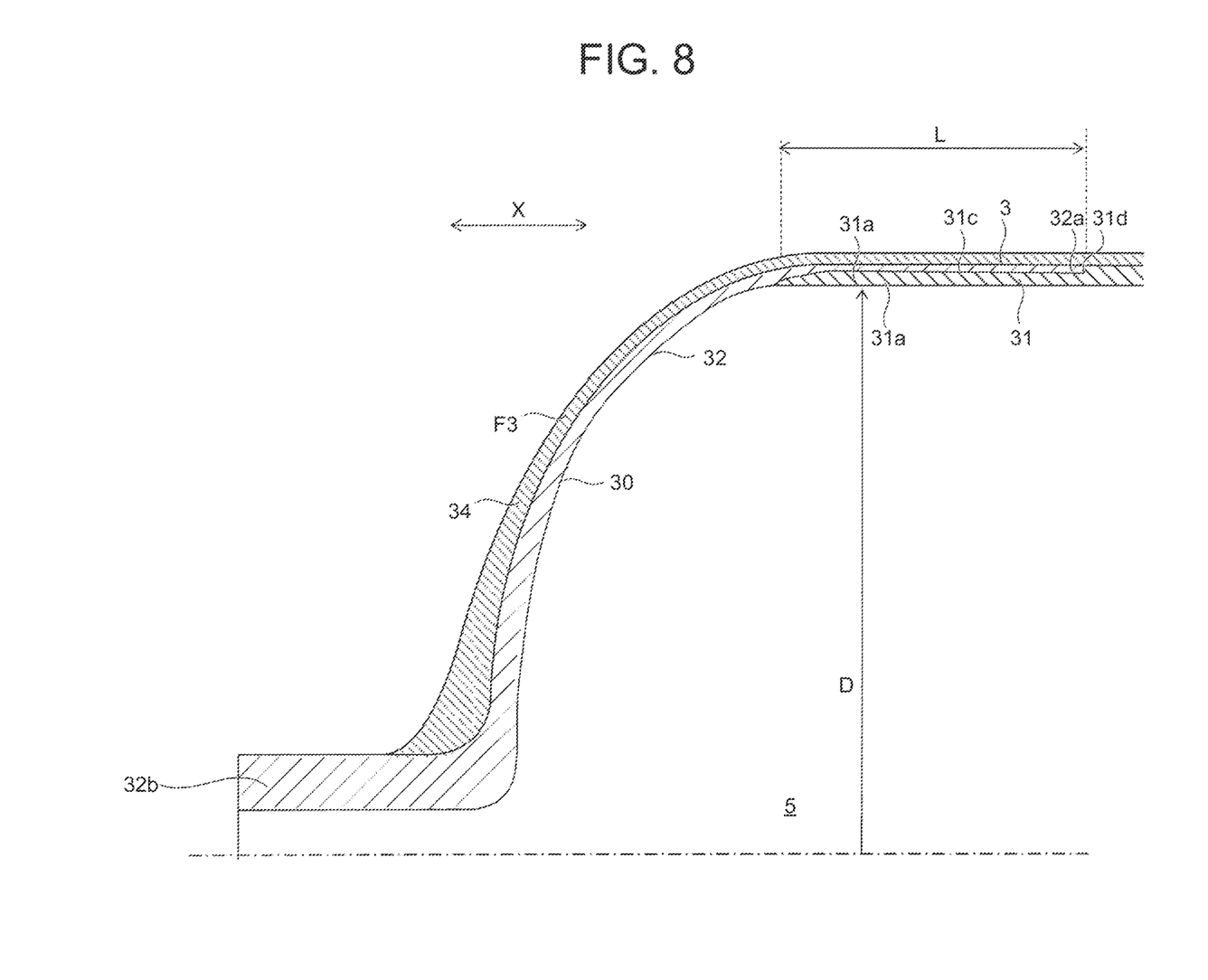
FIG. 8 is a schematic sectional view illustrating a step of forming a second reinforcing layer after the joining step shown in FIG. 3.

In the second reinforcing layer formation step S3, as shown in FIG. 8, the second reinforcing layer 34 is formed so as to cover the outer surface of the first reinforcing layer 30.

In this step, a fiber bundle impregnated with resin to form the second reinforcing layer 34 is wound in layers around the surface of the first reinforcing layer 30 by the FW method using helical winding. Specifically, when the reinforcing layer formed after the joining step S2 is the first reinforcing layer 30, the second reinforcing layer 34 that covers the first reinforcing layer 30 is formed by winding a fiber bundle F3 impregnated with resin around the first reinforcing layer 30 by helical winding so as to fill the interval between the side end members 32, 33 on both sides of the first reinforcing layer 30. Helical winding hear is so-called low-angle helical winding, which refers to winding the fiber bundle F3 at an inclination within a range of, for example, 10° or more to 60° or less relative to the axial direction X, and doing so while moving the fiber bundle F3 back and forth over a section between both ends of the first reinforcing layer 30. The number of layers of the wound fiber bundle is, for example, about two to ten, but is not particularly limited as long as the strength of the second reinforcing layer 34 is secured.

2-4. Liner Formation Step S4

Figure 9:
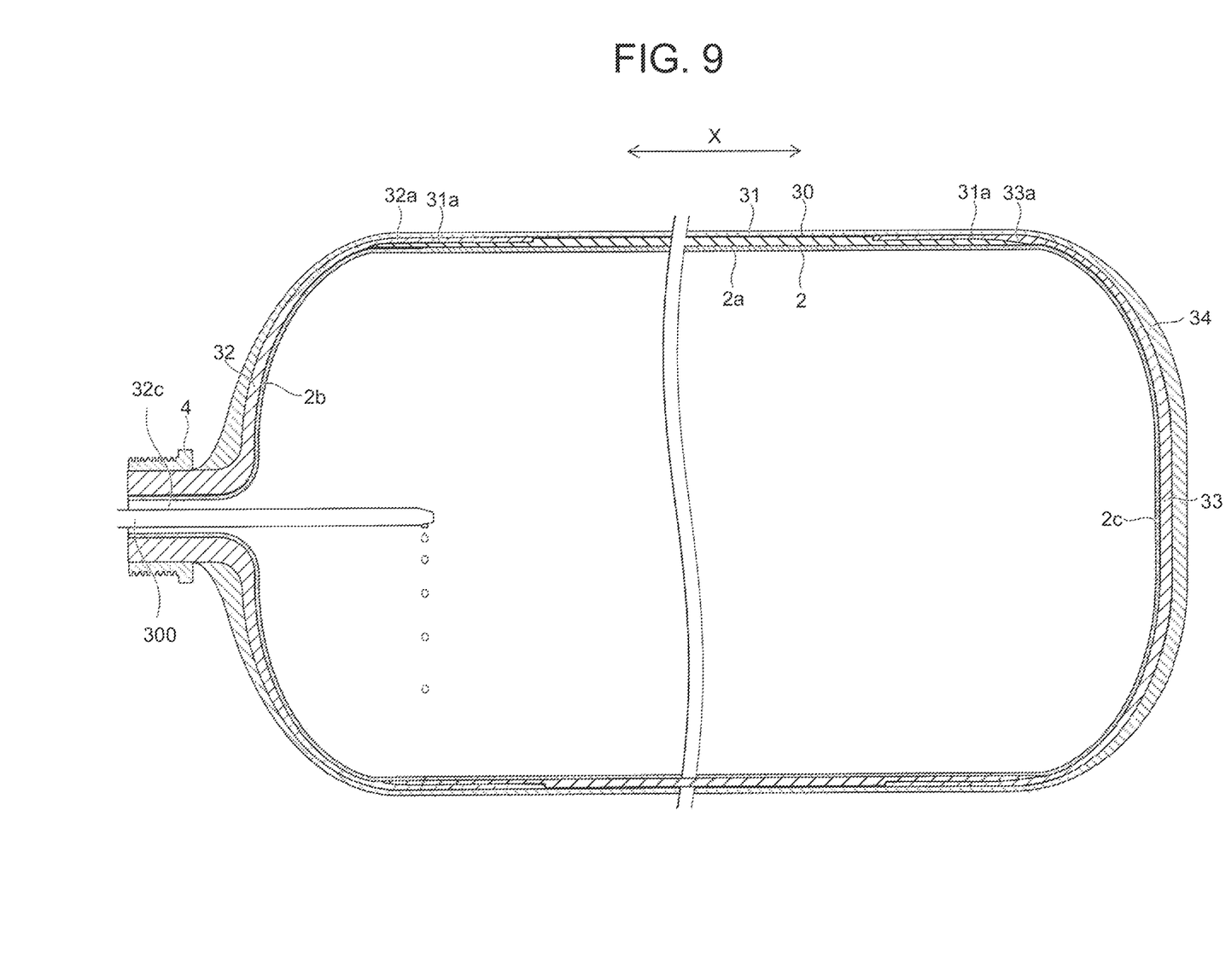
FIG. 9 is a schematic sectional view illustrating a liner formation step shown in FIG. 3.

Next, in the liner formation step S4, as shown in FIG. 9, a liner is formed by applying resin so as to cover an inner surface of the first reinforcing layer 30.

The method of applying the resin is not particularly limited as long as it can form the liner 2 on the surface of the first reinforcing layer 30. For example, as shown in FIG. 9, a nozzle 300 is inserted through the through-hole 32c by which an internal space and an external space of the first reinforcing layer 30 communicate with each other, and the resin is ejected through the nozzle 300. When ejecting the resin, the nozzle 300 is moved along the axial direction X while the first reinforcing layer 30 is rotated in a circumferential direction. Thus, the resin is applied to the entire inner surface of the first reinforcing layer 30. After application, the nozzle 300 is pulled out of the internal space through the through-hole 32c. Then, the resin is dried to form the liner 2. In this way, the high-pressure tank 1 as shown in FIG. 1 can be manufactured.

While the liner 2 is formed by application in this embodiment, it is also possible to form the liner 2 first, attach the tube member 31 to the liner 2, and then form the side end members 32, 33.

According to the present disclosure, in the joining step S2, the side end members 32, 33 are joined to both ends of the tube member 31 such that the outer wall surface 31f of the tube member 31 and the inner wall surfaces 32f, 33f of the side end members 32, 33 face each other. Thus, deformation of the tube member 31 trying to expand in a radial direction upon generation of an internal pressure can be borne by the side end members 32, 33.

When the side end members 32, 33 and the tube member 31 are overlapped with each other, the strength of the overlapping portions varies depending on interference, clearance, etc. Therefore, the margin for overlap between each of the side end members 32, 33 and the tube member 31 is specified to be within a range (a range of ratio) of 5% or more to 35% or less relative to the inside diameter of the tube member 31. Thus, stress acting on reinforced portions of the tube member 31 and the side end members 32, 33 that are the overlapping portions can be stably reduced, and moreover, variation in stress distribution in the reinforcing layers 30, 34 composed of a plurality of layers can also be reduced.

Here, if the above ratio is lower than 5%, a structure that can sufficiently withstand shear stress and bending stress on the overlapping portions (particularly border portions between the dome-shaped parts and the circular part) cannot be obtained. On the other hand, if the above ratio exceeds 35%, it becomes difficult to fit the side end members 32, 33 into the tube member 31 due to geometrical intersection between the side end members 32, 33 and the tube member 31.

The second reinforcing layer 34 that covers the first reinforcing layer 30 formed after the joining step S2 is formed by winding a fiber bundle impregnated with resin around the first reinforcing layer 30 by helical winding so as to fill the interval between the side end members 32, 33 on both sides of the first reinforcing layer 30. Thus, a load acting on the high-pressure tank 1 in the axial direction X upon generation of an internal pressure of the high-pressure tank 1 can be borne by the second reinforcing layer 34.

Here, the present inventor conducted an analysis based on an assumption of the 15 cases shown below. In this analysis, the length of the margin for overlap L, the coefficient of friction between the tube member and the side end members, and the initial clearance between the tube member and the side end members were set, and changes in distortion of shoulder parts (the border portions between the tube member and the side end members) of the high-pressure tank, distortion of the body part thereof, the ratio of the distortion of the shoulder parts to the distortion of the body part, and the internal pressure of the high-pressure tank were analyzed. The result is shown in Table 1.

TABLE 1

| No. | Margin for overlap (mm) | Coefficient of friction | Initial clearance (mm) | Distortion of shoulder part | Distortion of body part | Ratio of distortion | Internal pressure |
|---|---|---|---|---|---|---|---|
| 1 | 0 | 0.010 | 0.0 | 1.47 | 0.74 | 1.98 | 56.6 |
| 2 | 70 | 0.010 | 0.0 | 0.84 | 0.60 | 1.40 | 46.2 |
| 3 | 0 | 0.300 | 0.0 | 3.06 | 2.11 | 1.70 | 156.0 |
| 4 | 70 | 0.300 | 0.0 | 2.26 | 2.11 | 1.07 | 156.0 |
| 5 | 0 | 0.010 | 0.6 | 1.38 | 0.69 | 2.00 | 53.0 |
| 6 | 70 | 0.010 | 0.6 | 0.88 | 0.61 | 1.44 | 46.5 |
| 7 | 0 | 0.300 | 0.6 | 3.59 | 2.11 | 1.70 | 156.0 |
| 8 | 70 | 0.300 | 0.6 | 2.25 | 2.10 | 1.07 | 156.0 |
| 9 | 0 | 0.155 | 0.3 | 3.54 | 2.11 | 1.68 | 156.0 |
| 10 | 70 | 0.155 | 0.3 | 2.25 | 2.11 | 1.05 | 156.0 |
| 11 | 35 | 0.010 | 0.3 | 0.81 | 0.61 | 1.33 | 46.6 |
| 12 | 35 | 0.300 | 0.3 | 2.21 | 2.11 | 1.05 | 156.0 |
| 13 | 35 | 0.155 | 0.0 | 2.18 | 2.11 | 1.03 | 156.0 |
| 14 | 35 | 0.155 | 0.6 | 2.53 | 2.10 | 1.20 | 156.0 |
| 15 | 35 | 0.155 | 0.3 | 2.17 | 2.11 | 1.03 | 156.0 |

Figure 10:
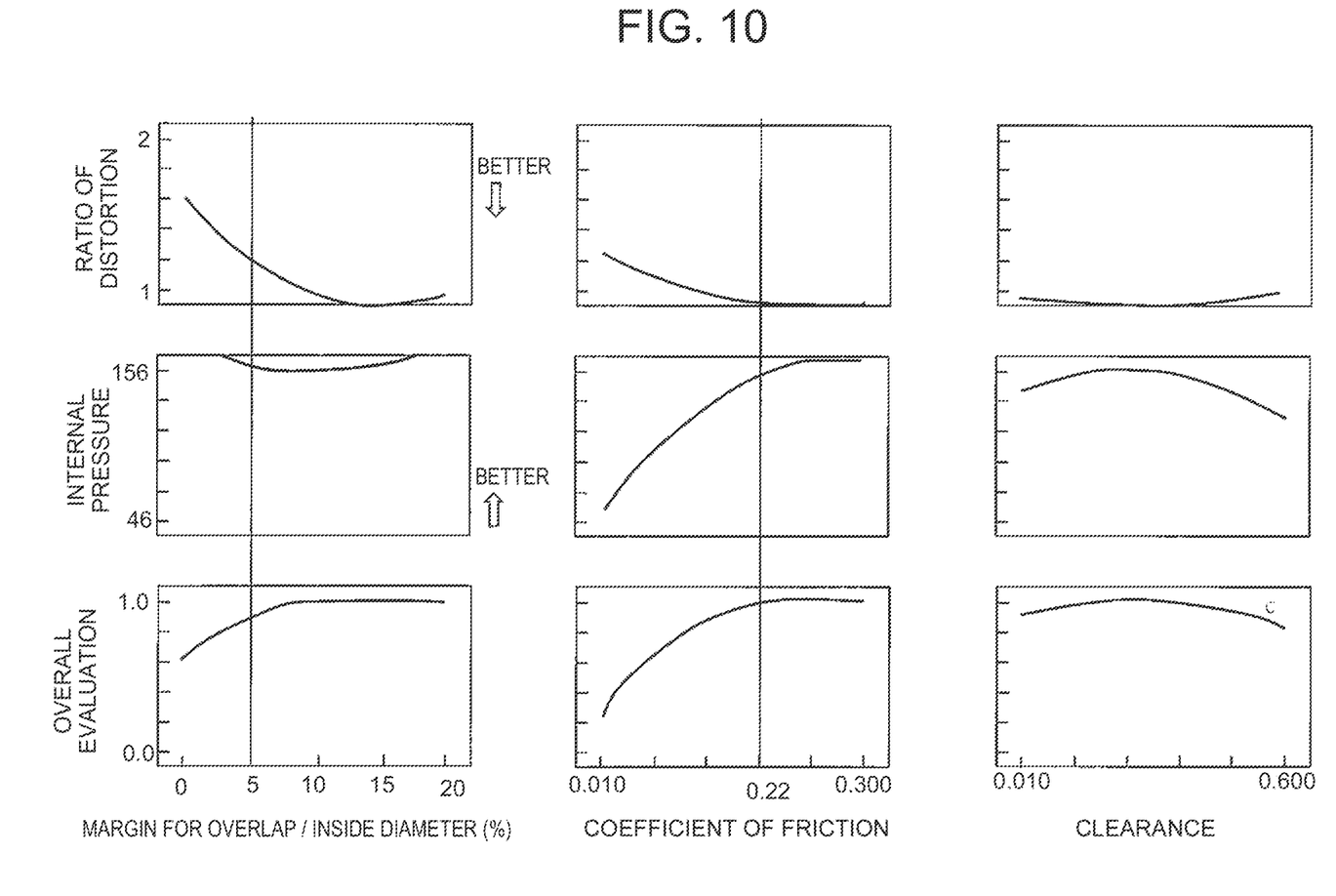
FIG. 10 is a result of analyzing changes in a ratio of distortion, an internal pressure, and an overall evaluation of the high-pressure tank in terms of each of a ratio of a margin for overlap to an inside diameter, a coefficient of friction, and a clearance.

Based on this result of the analysis, changes in the ratio of distortion, the internal pressure, and the overall evaluation of the high-pressure tank were analyzed in terms of each of the ratio of the margin for overlap to the inside diameter, the coefficient of friction, and the clearance. The result is shown in FIG. 10. The overall evaluation represents the properties of the high-pressure tank obtained by a regression equation using the ratio of distortion and the internal pressure of the high-pressure tank as variables, and the closer the overall evaluation is to 1.0, the better strength properties the high-pressure tank has.

From these results, it can be concluded that when the margin for overlap between each side end member and the tube member is 5% or more (more preferably, 8% or more) relatively to the inside diameter of the tube member, the strength of the high-pressure tank can be adequately secured. Further, it can be concluded that even when the coefficient of friction between the side end members and the tube member is 0.22 or higher, the strength of the high-pressure tank can be adequately secured as these members are adequately restrained.

The embodiment disclosed this time should be considered as being in every respect illustrative and not restrictive. The scope of the present disclosure is defined not by the description of the above embodiment but by the claims, and further includes all changes that are equivalent in meaning and scope to the claims.

What is claimed is:

1. A method of manufacturing a high-pressure tank that is formed by joining dome-shaped side end members to both ends of a cylindrical tube member, wherein the dome-shaped side end members and the cylindrical tube member form a first reinforcing layer made of fiber-reinforced resin, the manufacturing method comprising:
a step of joining the side end members to both axial ends of the tube member such that an outer circumferential wall surface of the tube member relative to a central longitudinal axis of the tube member and an inner circumferential wall surface of each of the side end members relative to a central longitudinal axis of the respective side end member face each other,
wherein in the joining step, a margin for overlap between each of the side end members and the tube member in an axial direction of the tube member is within a range of 5% or more to 35% or less relative to an inside diameter of the tube member, with portions of the side end members overlapping the outer circumferential wall surface of the tube member at both ends of the tube member, wherein each of the side end members and the tube member are joined by a frictional force in the axial direction acting between each of the side end members and the tube member and a coefficient of friction between each of the side end members and the tube member is 0.22 or higher, wherein a second reinforcing layer covers the entire first reinforcing layer comprising the cylindrical tube member and the side end members, wherein the second reinforcing layer is formed by winding a fiber bundle impregnated with resin around the first reinforcing layer by helical winding, wherein a liner is formed after the second reinforcing layer is formed by applying resin so as to cover an inner surface of the first reinforcing layer, and wherein the liner is formed by inserting a nozzle through a through-hole of the first reinforcing layer, the resin of the liner is ejected through the nozzle, and when ejecting the resin, the nozzle is moved along an axial direction of the first reinforcing layer while the first reinforcing layer is rotated in a circumferential direction.

2. The method of manufacturing the high-pressure tank according to claim 1, wherein the tube member includes a depression at each end of the outer circumferential wall surface of the tube member which are overlapped by circumferential ends of the portions of the side end members.

\* \* \* \* \*